(12) United States Patent
Aono et al.

(10) Patent No.: US 8,137,443 B2
(45) Date of Patent: Mar. 20, 2012

(54) ACTIVATED CARBON AND CANISTER AND INTAKE AIR FILTER UTILIZING THE SAME

(75) Inventors: Hirokazu Aono, Shizuoka (JP); Takayuki Suzuki, Shizuoka (JP); Yuji Mochizuki, Shizuoka (JP)

(73) Assignee: Cataler Corporation, Kakegawa-Shi (JP)

( * ) Notice: Subject to any disclaimer, the term of this patent is extended or adjusted under 35 U.S.C. 154(b) by 488 days.

(21) Appl. No.: 12/440,429

(22) PCT Filed: Oct. 4, 2007

(86) PCT No.: PCT/JP2007/069439
§ 371 (c)(1),
(2), (4) Date: Mar. 6, 2009

(87) PCT Pub. No.: WO2008/044587
PCT Pub. Date: Apr. 17, 2008

(65) Prior Publication Data
US 2010/0192774 A1 Aug. 5, 2010

(30) Foreign Application Priority Data
Oct. 12, 2006 (JP) .................................. 2006-278787

(51) Int. Cl.
*B01D 53/02* (2006.01)
(52) U.S. Cl. ............................ 96/108; 95/146; 502/416
(58) Field of Classification Search .................... 95/146; 96/108; 502/416
See application file for complete search history.

(56) References Cited

U.S. PATENT DOCUMENTS

| | | | |
|---|---|---|---|
| 4,963,519 A | 10/1990 | Okabayashi et al. | |
| 5,019,162 A | 5/1991 | Suzuki et al. | |
| 2003/0196553 A1 | 10/2003 | Mochizuki et al. | |
| 2008/0063592 A1* | 3/2008 | Nakahara et al. | 423/449.1 |

FOREIGN PATENT DOCUMENTS

| | | |
|---|---|---|
| CN | 1528510 A | 9/2004 |
| JP | 1-293134 A | 11/1989 |
| JP | 3-30834 A | 2/1991 |
| JP | 7-277716 A | 10/1995 |
| JP | 2003-314387 A | 11/2003 |
| JP | 2006-143494 A | 6/2006 |
| WO | WO-2005/113435 A1 | 12/2005 |

OTHER PUBLICATIONS

Chinese Office Action issued Sep. 2, 2010, in corresponding Chinese Application No. 200780037881.2.

* cited by examiner

*Primary Examiner* — Robert J Hill, Jr.
*Assistant Examiner* — Christopher P Jones
(74) *Attorney, Agent, or Firm* — Birch, Stewart, Kolasch & Birch, LLP

(57) ABSTRACT

The present invention provides an activated carbon having an average length/average diameter (L/D) of 0.8 to 1.2 and a difference between the 1/1-volume benzene adsorption rate and the 1/10-volume benzene adsorption rate of 6.0 g/100 mL or more, and a canister and an intake air filter utilizing such activated carbon as an adsorbent. The activated carbon has a substantially spherical configuration and excellent hydrocarbon adsorption/desorption capacity. A canister and an intake air filter utilizing such activated carbon as an adsorbent have excellent hydrocarbon adsorption/desorption capacity.

16 Claims, 1 Drawing Sheet

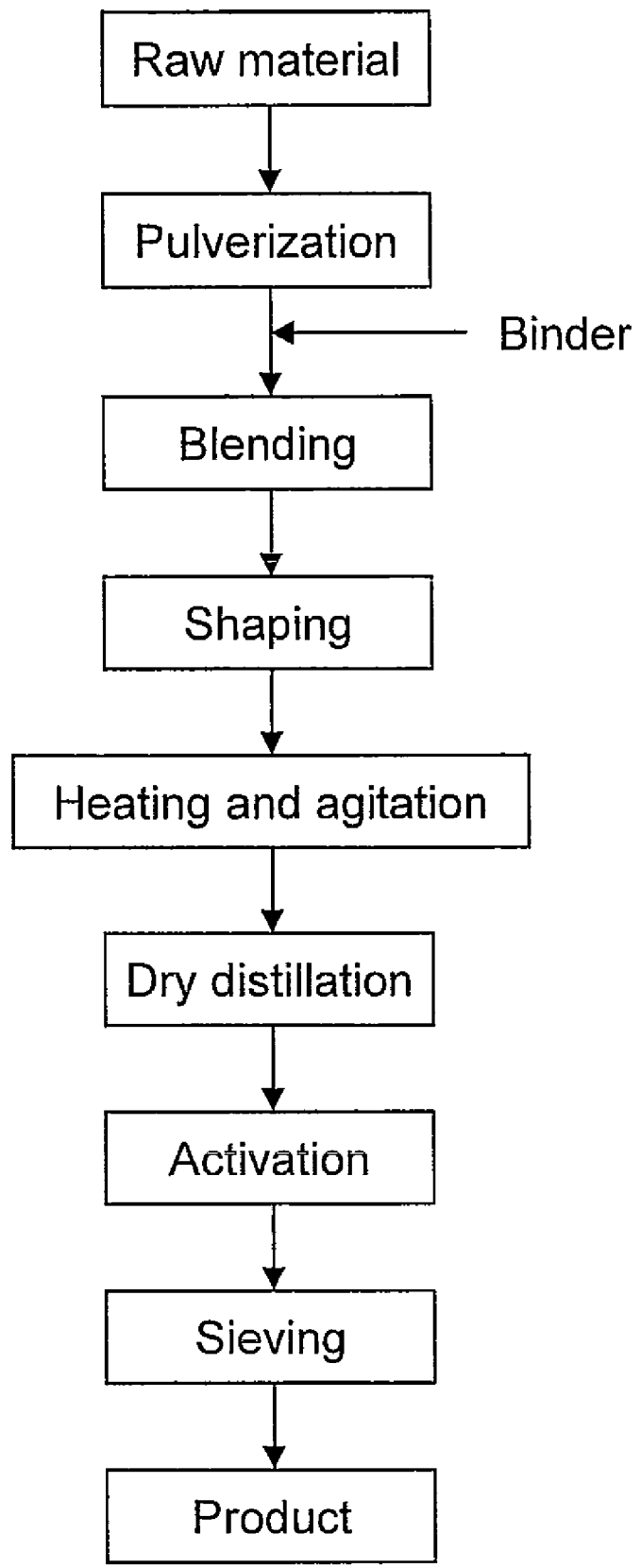

ACTIVATED CARBON AND CANISTER AND INTAKE AIR FILTER UTILIZING THE SAME

TECHNICAL FIELD

The present invention relates to a high-density activated carbon in a substantially spherical form that is excellent in fuel gas adsorption properties. In addition, the present invention relates to a canister and an intake air filter utilizing, as an adsorbent, the high-density activated carbon in a substantially spherical form that is excellent in fuel gas adsorption properties.

BACKGROUND ART

Gasoline, which is a fuel for automobiles, is highly volatile. Thus, driving and parking under the scorching sun cause vaporization of gasoline in a fuel tank, resulting in gasoline vapor emission into the air. Also, gasoline vapor is generated during fueling.

Therefore, in order to prevent gasoline vapor emission to the outside of vehicles, a canister is provided to vehicles such that activated carbon, which is an adsorbent contained in such a canister, adsorbs gasoline vapor. For example, a canister capable of adsorbing/desorbing fuel vapor is provided to an automobile internal combustion engine in order to prevent fuel vapor emission to the outside of a vehicle, such vapor evaporating from a fuel tank. In this case, a canister temporarily adsorbs fuel vapor generated after, for example, stopping of a vehicle and desorbs the adsorbed fuel components with fresh air during the subsequent driving for combustion treatment in an internal combustion engine.

In addition, an adsorbent in a canister adsorbs gasoline vapor generated upon gasoline fueling. Adsorbed gasoline vapor is desorbed (purged) from activated carbon as a result of engine rotation. Then, the vapor is mixed with intake air from the outside, guided through an intake air pipe to an engine, and burned.

In general, a granular activated carbon or a fibrous activated carbon is used as an adsorbent provided to an intake air system. In the case of a recently devised technique, a decrease in the adsorption capacity of an adsorbent can be prevented by limiting the pore distribution of a fibrous activated carbon so as to cause excellent desorption of an adsorbate. However, even with the use of such a fibrous activated carbon, the adsorption capacity decreases with long-term use in some cases. In addition, when such activated carbon is used while immobilized on a filter or the like, detachment of the activated carbon occurs and the airflow resistance of filter (such airflow being directed toward the inside of an internal combustion engine) increases, which have been problematic.

Therefore, in order to obtain a fuel vapor adsorbent that is unlikely to deteriorate even after long-term use, JP Patent Publication (Kokai) No. 2003-314387 A discloses a granular adsorbent having pores with pore sizes of 1.4 nm to 2.8 nm (50% or more pores) and a pore volume of 0.3 ml or more per 1 ml of adsorbent, which is provided inside an intake air system of an internal combustion engine.

As an aside, the form of a conventional activated carbon can be selected from a powder form, a granular form, a shaped form (e.g., a cylindrical form, a block form, a briquette form, or a spherical form). However, in a case in which an activated carbon with a large capacity per unit volume is required, forced shaping is carried out in many cases in order to increase the particle density. In such case, it is difficult to obtain an activated carbon in a spherical form. That is, a general spherically shaped product has a low particle density as a result of self-granulation, such as rolling granulation. Thus, when such product is subjected to advanced activation so as to be used for automobiles and the like, the capacity per unit volume does not increase, resulting in a decrease in hardness.

For example, activated carbon with the large adsorption rate per unit volume is required for automobile canisters. However, even when a container is filled with such activated carbon to a maximum extent, there arises a problem regarding ventilation pressure loss. Even in the case of an activated carbon in a spherical form that is appropriate for packing, the adsorption capacity per unit volume is not exhibited if the particle density is low, which results in a decrease in the working capacity (WC: adsorption/desorption capacity). Further, activated carbon with low particle density has a low degree of hardness, resulting in cracking or powdering. This is problematic for use.

DISCLOSURE OF THE INVENTION

In view of the above problems, it is an objective of the present invention to provide an activated carbon having a substantially spherical configuration and excellent hydrocarbon adsorption/desorption capacity and to provide a canister and an adsorption filter utilizing such activated carbon as an adsorbent.

The present inventors focused on the average length/average diameter (L/D) proportion and the volume-based benzene adsorption rate difference of an activated carbon. Then, they have found that the above problems can be solved when these values are within specific ranges. This has led to the present invention.

Specifically, in a first aspect, the activated carbon of the present invention is characterized by having an average length/average diameter (L/D) of 0.8 to 1.0 and a difference between the 1/1-volume benzene adsorption rate and the 1/10-volume benzene adsorption rate of 6.0 g/100 mL or more.

The above average length/average diameter (L/D) value is used as an index representing the activated carbon form. In the case of the activated carbon of the present invention, the value is 0.8 to 1.2 and preferably 0.9 to 1.1.

The above term "1/1-volume benzene adsorption rate" refers to a product obtained by multiplying the volume-based equilibrium benzene adsorption capacity (%) that is obtained using 1/1 benzene vapor for calculation in accordance with JIS 1474 5.12 by the packing capacity (g/100 mL) that is obtained in accordance with JIS 1474 5.7. In addition, the above term "1/10-volume benzene adsorption rate" refers to a product obtained by multiplying the volume-based equilibrium benzene adsorption capacity (%) that is obtained using 1/10 benzene vapor for calculation in accordance with JIS 1474 5.12 by the packing capacity (g/100 mL) that is obtained in accordance with JIS 1474 5.7. Further, the difference between the 1/1-volume benzene adsorption rate and the 1/10-volume benzene adsorption rate means a value representing benzene adsorption/desorption capacity. In the case of the activated carbon of the present invention, the above value is 6.0 g/100 mL or more, preferably 7.0 g/100 mL or more, and further preferably 8.8 g/100 mL or more.

In addition, the above 1/1-volume benzene adsorption rate represents an amount of benzene that can be adsorbed. Such amount is preferably 20 g/100 mL or more and more preferably 25 g/100 mL or more.

Further, in the case of the activated carbon of the present invention, the average diameter (D) is preferably 0.5 to 10 mm and more preferably 1.5 to 8 mm.

Furthermore, the hardness of the activated carbon of the present invention that is determined in accordance with JIS K1474 5.5 is preferably 90% or more and more preferably 95% or more.

The present application describes the properties of the activated carbon in relation to benzene, which is a typical volatile hydrocarbon. However, the properties obtained based on the above values can be indexes for evaluating the capacity of the activated carbon in relation to another volatile hydrocarbon, such as gasoline.

In a second aspect, the present invention concerns a canister, characterized by utilizing the above activated carbon as an adsorbent. Herein, the configuration of the canister is not particularly limited. However, the activated carbon serving as an adsorbent is preferably used therein at a portion located in the vicinity of at least an air port. Also, an embodiment in which a canister has a multilayer structure is preferably included in the present invention.

In a third aspect, the present invention concerns an intake air filter, characterized by utilizing the above activated carbon as an adsorbent.

The activated carbon of the present invention has a substantially spherical configuration and is excellent in terms of hydrocarbon adsorption/desorption capacity.

Further, since the activated carbon of the present invention has the above properties, large airflows are realized in a canister, an intake air filter, and the like, and thus the activated carbon can be preferably used for applications with significant hydrocarbon concentration fluctuation. In addition, the activated carbon of the present invention has a substantially spherical configuration while retaining the above properties, and thus it is excellent in terms of packing capacity. Thus, in the cases of a canister and an intake air filter in which the activated carbon is used as an adsorbent, packing of an increased amount of the activated carbon per unit volume can be achieved. Furthermore, since the activated carbon is excellent in terms of packing capacity, the activated carbon is less likely to be damaged as a result of confliction or collision of activated carbon particles caused by vibration or the like, resulting in substantially no negative influences upon vehicles. Also, the activated carbon is excellent in terms of handling.

That is, when compared with conventional products obtained via forced shaping, the activated carbon of the present invention has a substantially spherical configuration and excellent adsorption/desorption capacity per unit volume. In addition, it has low ventilation pressure loss and a high degree of hardness. Therefore, due to shape effects, when it is used as an activated carbon for a canister, the carbon amount per unit volume can be increased and the WC capacity can be improved without an increase in ventilation pressure loss. Further, due to shape effects, the activated carbon of the present invention exhibits improved handling and packing properties.

BRIEF DESCRIPTION OF THE DRAWINGS

FIG. 1 is a flowchart of an example of a method for producing the activated carbon of the present invention.

BEST MODE FOR CARRYING OUT THE INVENTION

In the case of the activated carbon of the present invention, the above average length/average diameter (L/D) proportion is approximately 1.0 and specifically 0.8 to 1.2 (preferably 0.9 to 1.1), which means that the activated carbon has a ball-like (substantially spherical) configuration. Therefore, a container or the like can be filled with the activated carbon at a high density. In addition, when a container or the like is filled with the activated carbon, there are few gaps between activated carbon particles, indicating that the container has little space for allowing the activated carbon particles to move. As a result, activated carbon particles are less likely to collide with each other, indicating that the container has little space for allowing the activated carbon particles to move. As a result, activated carbon particles are less likely to collide with each other, and thus it is possible to prevent the activated carbon from being damaged as a result of such collision.

Further, in order to enhance the above effects, the D value of L/D above is preferably 10 mm or less (and further preferably 8 mm or less), although such value would vary depending on application. Meanwhile, if the activated carbon of the present invention is in an excessively fine powder form, clogging is likely to occur depending on application (e.g., as an adsorbent used for a canister or intake air filter as described below). Therefore, the lower limit of the above value is preferably 0.5 mm (and further preferably 1.5 mm).

In addition, the term "substantially spherical" used in the present specification includes not only spherical and egg forms but also barrel forms obtained in a manner such that edges of a cylindrical form are rounded.

The average length (L), the average diameter (D), and the average length/average diameter values in relation to the present invention can be determined by a conventional method. For instance, a measurement tool such as a vernier caliper can be used for measuring the sizes of activated carbon particles. Also, such sizes can be measured by obtaining enlarged views of activated carbon particles with a microscope and using a measurement tool on the enlarged image. In addition, the number of times for measurement is not particularly limited; however, it may be generally approximately 20 times.

Further, the activated carbon of the present invention is excellent in terms of the adsorption/desorption capacity because it can externally release a large amount of hydrocarbon that has been absorbed/retained therein (such amount corresponding to the 1/1-volume benzene adsorption rate) in an environment containing hydrocarbon at a high concentration when the hydrocarbon concentration decreases. In other words, it can temporarily adsorb/retain a large amount of hydrocarbon (such amount being expressed as a difference between the 1/1-volume benzene adsorption rate and the 1/10-volume benzene adsorption rate).

The above 1/1- (or 1/10-) volume benzene adsorption rate can be obtained by multiplying the volume-based equilibrium benzene adsorption capacity (%) that is obtained using 1/1 (or 1/10) benzene vapor for calculation in accordance with JIS 1474 5.12 by the packing density (g/100 mL) that is obtained in accordance with JIS 1474 5.7.

The equilibrium benzene adsorption rate can be determined by the solvent vapor adsorption capacity test method (described in 5.1.2) selected from among activated carbon test methods described in JIS K1474. According to the present invention, benzene vapor that can be adsorbed by an adsorbent is designated as an adsorbate. The term "1/1 benzene vapor" refers to solvent vapor of a saturated benzene solvent. The term "1/10 benzene vapor" refers to solvent vapor obtained by mixing solvent vapor of a saturated benzene solvent and air at a ratio of 1:9. In addition, the equilibrium benzene adsorption capacity represents the adsorbent mass increase rate in a case in which a constant mass of an adsorbent containing benzene solvent vapor is obtained by the above test method while benzene solvent vapor is allowed to pass through the adsorbent. That is to say, in such case, equilibrium between the flow of solvent vapor into the adsorbent and the flow of solvent vapor from the adsorbent is achieved. For instance, when the equilibrium benzene adsorption capacity of an adsorbent is 50%, the mass of the adsorbent increases by 50% compared with that obtained before passage of solvent vapor.

Further, in order to improve the adsorption/desorption capacity, it is preferable for an activated carbon to adsorb/retain hydrocarbon in as large an amount as possible in an environment containing hydrocarbon at a high concentration. For such purpose, the above 1/1 benzene adsorption rate is preferably 20 g/100 mL or more (and further preferably 25 g/100 mL or more), although it would vary depending on application.

In addition, preferably, an activated carbon has a certain level of strength, although this level would vary depending on application. Therefore, the activated carbon of the present invention has a hardness (obtained in accordance with JIS K1474 5.5) of preferably 90% or more (and particularly preferably 95% or more).

The activated carbon of the present invention can be produced by a combination of known methods.

FIG. 1 is a flowchart of an example of a method for producing the activated carbon of the present invention.

Examples of an activated carbon used in the present invention include the following activated products: water vapor activated products made from a variety of raw materials such as coal-based, palm shell-based, ligneous, and lignin-based raw materials; and chemically activated products obtained via activation with phosphoric acid, zinc chloride, alkali metal, and the like. Of these, ligneous phosphoric acid-activated products are preferable. The particle size of powdered activated carbon described above is not particularly limited. However, in view of shaping capacity and the strength of a shaped carbon, the particle size thereof is generally 0.5 mm or less and preferably 0.05 to 0.15 mm. Particularly preferably, 60% to 95% of the particles pass through 200 mesh. Also, preferably, 60% or more of the particles pass through 100 mesh and 50% or fewer of the particles pass through 325 mesh. Further preferably, 80% or more of the particles pass through 100 mesh and 40% or fewer of the particles pass through 325 mesh. Even more preferably, 80% to 90% of the particles pass through 100 mesh and 20% to 40% of the particles pass through 325 mesh.

The specific surface area of the activated carbon applied to the present invention is not particularly limited. However, when it is too small, it is difficult to obtain sufficient adsorption capacity in some cases. When it is too large, it is difficult to obtain sufficient strength in some cases. Thus, it is desired that the specific surface area be 500 to 2500 m$^2$/g, specifically 1000 to 2000 m$^2$/g, and more specifically 1500 to 2000 m$^2$/g.

The activated carbon of the present invention can be produced by a known activation treatment at a known carbonization temperature depending on materials used. Temperature conditions for carbonization may be 500° C. to 900° C. Further, in general, an activation treatment is carried out in an active gas atmosphere containing water vapor, carbonic acid gas, oxygen, and the like. For example, in a case in which coal powder is used as a raw material, it is preferable to carbonize coal powder at 700° C. and then activate the resultant in a water vapor atmosphere at a temperature of 900° C. The activation time can be adjusted, according to need, in a manner such that the above average length/average diameter (L/D) proportion and the volume-based benzene adsorption rate difference fall within specific ranges.

Regarding shaping, the activated carbon of the present invention can be obtained by blending a powdered activated carbon, clay, a metal powder for a solid heat storage medium, and a boron compound and/or a phosphorus compound with the appropriate addition of a plasticizer such as water, followed by shaping and calcination. In general, the above raw materials may be blended with the use of a blender such as a kneader at room temperature until the blended product is plasticized and thus can be held with the hands. The amount of water used for blending may be an amount at which the blended product can be held with the hands. Such amount is generally 50 to 200 parts by weight and preferably 100 to 150 parts by weight with respect to 100 parts by weight of the activated carbon. Next, the blended product is extruded and then subjected to shaping into a desired form, such as a cylindrical or spherical form, with a shaping machine such as a press. Thus, a granular carbon is obtained. For instance, a granular carbon is produced by extrusion granulation and the granular carbon is pulverized with an adequate crusher according to need, followed by granulating. Thereafter, the resulting product can be processed into a pulverized granular carbon with a particle size within a desired range. Subsequently, the granular carbon or pulverized granular carbon is subjected to calcination in a gas atmosphere containing no oxygen at generally 400° C. to 1000° C. and preferably 500° C. to 900° C., followed by water vapor activation or chemical activation at 700° C. to 1200° C. and preferably at 900° C. to 1000° C. Accordingly, a shaped activated carbon of interest is obtained.

In addition, the granular carbon may be subjected to rolling treatment prior to calcination, such that the granular carbon surface may be smoothened and thus the bulk density can be increased. Rolling treatment can be carried out at generally approximately 30 to 300 rpm and preferably approximately 50 to 100 rpm for approximately 10 minutes to 10 hours and preferably approximately 30 minutes to 3 hours. Further, before or after calcination, washing treatment or drying treatment can be carried out according to need. Washing may be carried out in a manner such that the activated carbon adsorption capacity is not influenced by washing. Washing is carried out with deionized water, clean water, or the like for generally approximately several tens seconds to several hours and preferably approximately 10 minutes to 1 hour with heating according to need. Heating conditions may be 30° C. to 100° C. Drying conditions may be generally approximately 50° C. to 200° C. and preferably approximately 100° C. to 150° C. for generally approximately 30 minutes to 50 hours and preferably approximately 1 hour to 10 hours.

The activated carbon of the present invention is not particularly limited in terms of applications. However, since the activated carbon of the present invention has the above properties, it can be particularly preferably used as an adsorbent for canisters and intake air filters.

Hereinafter, the present invention is described with reference to the Examples and the Comparative Examples.

EXAMPLES

[Example 1]

First, coal was pulverized in a manner such that the particle size became 100 μm or less (50 μm or less on average). Then, 30 parts by weight of coal tar was added to 100 parts by weight of the pulverized coal, followed by blending. Next, the obtained blended product was extruded into a cylindrical shape at a pressure of 15 MPa, followed by agitation treatment. Thereafter, the product was subjected to dry distillation in a reduction atmosphere at 500° C. for 1 hour and to activation treatment in a water vapor atmosphere at 950° C. for 5 hours. Thus, the activated carbon for Example 1 was obtained.

Agitation was carried out in a water vapor atmosphere for 20 minutes for agitation treatment.

[Example 2]

The activated carbon for Example 2 was obtained in the same manner as in Example 1 except that the agitation temperature was determined to be 60° C.

[Comparative Example 1]

The activated carbon for Comparative Example 1 was obtained in the same manner as in Example 1 except that agitation treatment was not carried out.

[Comparative Example 2]

The activated carbon for Comparative Example 2 was obtained in the same manner as in Example 1 except that agitation was carried out in a normal atmosphere at 60° C. for 20 minutes for agitation treatment.

[Comparative Example 3]

The activated carbon for Comparative Example 3 was obtained in the same manner as in Example 1 except that extrusion-shaped carbon maintained at 60° C. was placed in water and then agitation was carried out for 20 minutes for agitation treatment.

[Comparative Example 4]

Commercially available activated carbon in a spherical form with a particle size of 3.0 mm (produced by Shanxi xuanzhong chemical industry Co., Ltd.; product name: QJ 2.0) was used.

Table 1 below lists physical properties of each of the activated carbons as obtained in Examples 1 and 2 and Comparative Examples 1 to 4. In the case of Comparative Example 3, mass formation was observed after agitation, and thus it was impossible to subject such mass to the subsequent steps.

TABLE 1

|  | Example 1 | Example 2 | Comparative Example 1 | Comparative Example 2 | Comparative Example 4 |
|---|---|---|---|---|---|
| Packing density (g/ml) | 0.40 | 0.40 | 0.41 | 0.40 | 0.49 |
| 1/10 benzene adsorption capacity (%) | 44.0 | 43.3 | 44.3 | 43.5 | 29.1 |
| 1/1 benzene adsorption capacity (%) | 66.5 | 65.3 | 60.8 | 64.9 | 38.2 |
| 1/10-volume benzene adsorption capacity (g/100 ml) | 17.6 | 17.3 | 18.2 | 17.4 | 14.3 |
| 1/1-volume benzene adsorption capacity (g/100 ml) | 26.6 | 26.1 | 24.9 | 26.0 | 18.8 |
| Volume-based benzene adsorption capacity difference (g/100 ml) | 9.0 | 8.8 | 6.8 | 8.6 | 4.5 |
| Hardness (%) | 97.3 | 98.5 | 99.5 | 96.5 | 97.7 |
| Diameter (min) | 2.3 | 2.3 | 2.0 | 2.1 | 1.8 |
| L/D | 1.05 | 1.06 | 1.78 | 1.40 | 1.00 |

The following facts have been revealed based on the results listed in table 1.

(1) In the case of Examples 1 and 2, the L/D value was 0.8 to 1.2, and thus activated carbon with a large adsorption rate per unit volume was obtained.

(2) In the case of Comparative Example 1, the capacity per unit volume was acceptable. However, the obtained L/D value was 1.5 to 2.0. This indicates deterioration of the packing capacity in a container, which results in frequent drift development.

(3) In the case of Comparative Example 2, the capacity per unit volume was acceptable. However, the obtained L/D value was 1.3 to 1.7. This indicates deterioration of the packing capacity in a container, which results in frequent drift development. In addition, mass formation during agitation causes yield reduction.

(4) In the case of Comparative Example 3, the temperature of shaped carbon decreased. Thus, a spherically shaped product cannot be obtained in a sufficient manner.

(5) In the case of Comparative Example 4, the obtained capacity per unit volume was insufficient. Thus, hardness reduction occurs even with activation for hardness. In addition, a large amount of fine powder is formed.

Industrial Applicability

The activated carbon of the present invention has a substantially spherical configuration and thus it is excellent in the adsorption/desorption capacity per unit volume. Further, it has low ventilation pressure loss and a high degree of hardness. Therefore, due to shape effects, when it is used as an activated carbon for a canister, the carbon amount per unit volume can be increased and the WC capacity can be improved without an increase in ventilation pressure loss. Further, due to shape effects, the activated carbon of the present invention exhibits improved handling and packing properties.

The invention claimed is:

1. An activated carbon having an average length/average diameter (L/D) of 0.8 to 1.2 and a difference between the 1/1-volume benzene adsorption rate and the 1/10-volume benzene adsorption rate of 8.6 g/100 mL or more; wherein the 1/1-volume benzene adsorption rate is a product obtained by multiplying the volume-based equilibrium benzene adsorption capacity (%) that is obtained using 1/1 benzene vapor for calculation in accordance with JIS 1474 5.12 by the packing capacity (g/100 mL) that is obtained in accordance with JIS 1474 5.7, and the 1/10-volume benzene adsorption rate is a product obtained by multiplying the volume-based equilibrium benzene adsorption capacity (%) that is obtained using 1/10 benzene vapor for calculation in accordance with JIS 1474 5.12 by the packing capacity (g/100 mL) that is obtained in accordance with JTS 1474 5.7.

2. The activated carbon according to claim 1, wherein the 1/1-volume benzene adsorption rate is 20 g/100 mL or more.

3. The activated carbon according to claim 1 or 2, wherein the average diameter (D) is 0.5 to 10 mm.

4. The activated carbon according to claim 1, wherein the hardness of the activated carbon that is determined in accordance with JIS K1474 5.5 is 90% or more.

5. A canister utilizing the activated carbon according to claim 1 as an adsorbent.

6. An intake air filter utilizing the activated carbon according to claim 1 as an adsorbent.

7. The activated carbon according to claim 1 which is obtained by a process which comprises
preparing a blended product by blending raw materials which contains a powdered activated carbon,
preparing a granular carbon by shaping the blended product, and
agitation treatment of the granular carbon.

8. The activated carbon according to claim 7, wherein the difference between the 1/1-volume benzene adsorption rate and the 1/10-volume benzene adsorption rate is 8.8 g/100 mL or more; and the agitation treatment of the granular carbon is carried out in a water vapor atmosphere.

9. The activated carbon according to claim 7, wherein the difference between the 1/1-volume benzene adsorption rate and the 1/10-volume benzene adsorption rate is 8.8 g/100mL or more; and the agitation treatment of the granular carbon is carried out at 60° C.

10. The activated carbon according to claim 7, wherein the raw material of the activated carbon is selected from the group consisting of coal-based, palm shell-based, ligneous, and lignin-based raw materials.

11. The activated carbon according to claim 7, wherein the raw material of the activated carbon is activated with water vapor, phosphoric acid, zinc chloride, or alkali metal.

12. The activated carbon according to claim 7, wherein the raw material of the activated carbon has a particle size of 0.5 mm or less.

13. The activated carbon according to claim 7, wherein the raw material of the activated carbon comprises particles that pass through 200 mesh in an amount of 60% to 95%.

14. The activated carbon according to claim 7, wherein the raw material of the activated carbon has a specific surface area of 500 to 2500 $m^2/g$.

15. An activated carbon having an average length/average diameter (L/D) of 0.8 to 1.2, a difference between the 1/1-volume benzene adsorption rate and the 1/10-volume benzene adsorption rate of 8.6 g/100mL or more, and a packing density of 0.40 g/ml or less which is obtained by a process which comprises preparing a blended product by blending raw materials which contains a powdered activated carbon, preparing a granular carbon by shaping the blended product and agitation treatment of the granular carbon.

16. An activated carbon having an average length/average diameter (LD) of 0.8 to 1.06, a difference between the 1/1-volume benzene adsorption rate and the 1/10-volume benzene adsorption rate of 8.8 g/100mL or more, and a packing density of 0.40 g/ml or less which is obtained by a process which comprises preparing a blended product by blending raw materials which contains a powdered activated carbon, preparing a granular carbon by shaping the blended product, and agitation treatment of the granular carbon in a water vapor atmosphere.

* * * * *